US011933240B2

(12) United States Patent
Svensson et al.

(10) Patent No.: US 11,933,240 B2
(45) Date of Patent: Mar. 19, 2024

(54) NOX MITIGATION STRATEGY IN METHANOL INTERNAL COMBUSTION ENGINE

(71) Applicant: Caterpillar Inc., Peoria, IL (US)

(72) Inventors: Kenth I Svensson, Peoria, IL (US); David Todd Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 4 days.

(21) Appl. No.: 17/734,625

(22) Filed: May 2, 2022

(65) Prior Publication Data

US 2023/0349339 A1 Nov. 2, 2023

(51) Int. Cl.

| | |
|---|---|
| ***F02D 41/14*** | (2006.01) |
| ***F02D 41/00*** | (2006.01) |
| ***F02M 25/022*** | (2006.01) |
| ***F02M 25/03*** | (2006.01) |
| ***F02M 25/035*** | (2006.01) |

(52) U.S. Cl.

CPC ..... *F02D 41/1461* (2013.01); *F02D 41/0027* (2013.01); *F02D 41/1406* (2013.01); *F02M 25/0227* (2013.01); *F02M 25/035* (2013.01); *F02D 2250/36* (2013.01)

(58) Field of Classification Search

CPC ...... F02D 41/00; F02D 41/0027; F02D 41/14; F02D 41/1406; F02D 41/1462; F02M 25/02; F02M 25/0227; F02M 25/03; F02M 25/035

See application file for complete search history.

(56) References Cited

U.S. PATENT DOCUMENTS

| | | | | |
|---|---|---|---|---|
| 5,579,631 | A * | 12/1996 | Chen .......................... | F02C 7/16 60/39.59 |
| 5,797,259 | A * | 8/1998 | Nielsen .................... | F22B 21/26 60/39.182 |
| 6,089,012 | A * | 7/2000 | Sugishita .................. | F02C 7/16 60/730 |
| 6,532,744 | B1 * | 3/2003 | Reiter ...................... | F02C 7/185 60/39.83 |
| 10,247,140 | B2 | 4/2019 | McQuillen et al. | |
| 10,330,028 | B2 | 6/2019 | Hakeem et al. | |
| 10,378,436 | B2 | 8/2019 | Mulye | |
| 2001/0022075 | A1 * | 9/2001 | Mandai ................... | F01K 23/10 60/39.182 |
| 2001/0022087 | A1 * | 9/2001 | Kobayashi .............. | F02C 7/185 60/736 |

(Continued)

FOREIGN PATENT DOCUMENTS

CN 207830006 U 9/2018

*Primary Examiner* — John Kwon
*Assistant Examiner* — Johnny H Hoang
(74) *Attorney, Agent, or Firm* — Brannon Sowers & Cracraft PC

(57) ABSTRACT

Operating an internal combustion engine system includes feeding a stream of pressurized intake air to a plurality of cylinders in an engine for combustion with a methanol fuel. An engine parameter indicative of at least one of an exhaust NOx level or a change to the exhaust NOx level of the engine is monitored, and water injected into an intake conduit for the engine based on the monitored engine parameter to limit the exhaust NOx level of the engine. Related apparatus and control logic is disclosed.

20 Claims, 2 Drawing Sheets

(56) References Cited

U.S. PATENT DOCUMENTS

| | | | | |
|---|---|---|---|---|
| 2007/0131180 | A1 | 6/2007 | Roehm | |
| 2009/0260342 | A1* | 10/2009 | Ishiguro | F02C 1/04<br>60/39.55 |
| 2010/0121559 | A1 | 5/2010 | Bromberg et al. | |

* cited by examiner

NOX MITIGATION STRATEGY IN METHANOL INTERNAL COMBUSTION ENGINE

TECHNICAL FIELD

The present disclosure relates generally to controlling NOx emissions from an internal combustion engine, and more particularly to injecting water into an intake conduit to limit an exhaust NOx level of an engine operating on a methanol fuel.

BACKGROUND

Internal combustion engines are well-known throughout the world for diverse applications ranging from propulsion in land vehicles and marine vessels to electrical power generation and operation of pumps, compressors, and other equipment. Engineers have experimented for decades with strategies for controlling certain emissions from operation of internal combustion engines, including particulate matter, oxides of nitrogen or "NOx," and others. In recent years, considerable research effort has been directed at the use of alternative fuels producing reduced amounts of various emissions and/or having differing emissions footprints as compared to traditional hydrocarbon fuels such as diesel, gasoline, and natural gas.

One such alternative fuel showing promise for widespread adoption is methanol and methanol blends. Methanol offers the advantage of significantly reduced and potentially near zero production of certain emissions. Many engines and operating strategies conventionally known are nevertheless specifically designed for traditional hydrocarbon fuels, and thus engineers continue to seek improvements relating to adapting existing platforms to methanol as well as development of altogether new engine and fuel system configurations, and operating and emissions mitigation strategies. U.S. Pat. No. 5,560,344 to Chan sets forth one known technology directed to a fuel delivery and storage apparatus for a multi-fuel engine that utilizes methanol.

SUMMARY

In one aspect, a method of operating an internal combustion engine system includes feeding a stream of pressurized intake air through an intake conduit to a plurality of cylinders in an engine, and combusting a methanol fuel and the pressurized air in the plurality of cylinders. The method further includes monitoring an engine parameter indicative of at least one of an exhaust NOx level or a change to the exhaust NOx level of the engine. The method further includes injecting water for reducing or limiting temperature in the plurality of cylinders, based on the monitored engine parameter, and limiting the exhaust NOx level of the engine based on the injecting water.

In another aspect, an internal combustion engine system includes a methanol fuel supply, an engine having a plurality of combustion cylinders formed therein, and a plurality of methanol admission valves fluidly connected to the methanol fuel supply. The engine system further includes an intake conduit having a water port, and extending to the engine to feed a stream of pressurized intake air to the plurality of cylinders, and a water injector coupled to the water port. The engine system further includes a sensor structured to monitor an engine parameter indicative of at least one of an exhaust NOx level of the engine or a change to the exhaust NOx level of the engine. The engine system further includes a NOx control unit coupled to the sensor and in control communication with the water injector. The NOx control unit is structured to receive data of the monitored engine parameter produced by the sensor, and to output a water injection command to the water injector based on the data, to limit the exhaust NOx level of the engine via injection of water into the intake conduit.

In still another aspect, a NOx control system for an internal combustion engine includes a water supply conduit, a water injector fluidly connected to the water supply conduit, and a heater coupled to the water supply conduit and structured to heat water conveyed to the water injector for injection as steam into an intake conduit of an engine. The NOx control system further includes a sensor structured to monitor an engine parameter indicative of at least one of an exhaust NOx level or a change to the exhaust NOx level of the engine, and a NOx control unit coupled to the sensor and in control communication with the water injector. The NOx control unit is structured to receive data of the monitored engine parameter produced by the sensor, compare an exhaust NOx level indicated by the data to a target exhaust NOx level, and to output a water injection command to the water injector based on a difference between the indicated exhaust NOx level and the target exhaust NOx level. The NOx control unit is still further structured to limit the exhaust NOx level of the engine based on an injection of water as steam produced in response to the water injection command.

DETAILED DESCRIPTION

Figure 1:
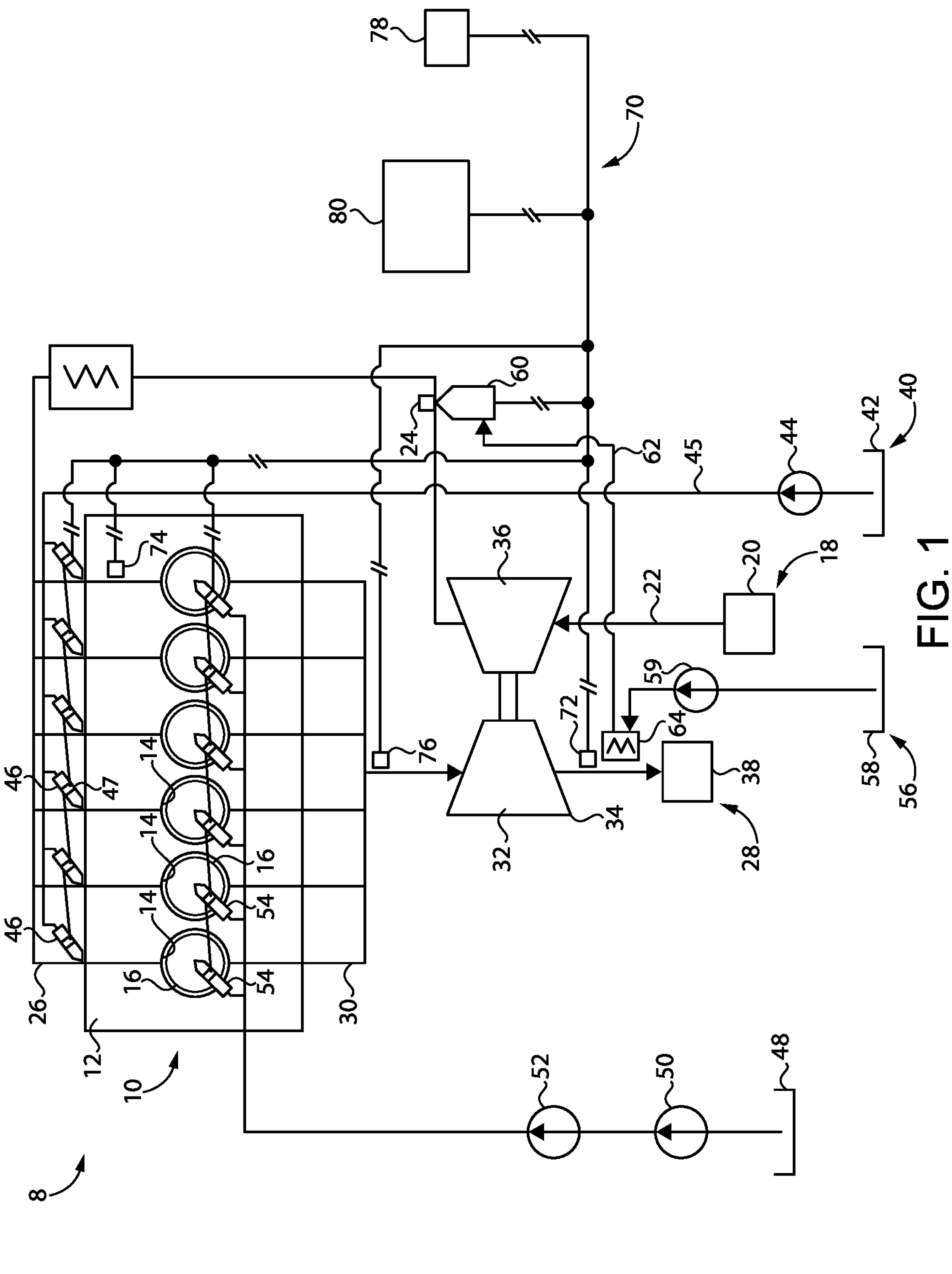
FIG. 1 is a diagrammatic view of an internal combustion engine system, according to one embodiment.

Referring to FIG. 1, there is shown an internal combustion engine system 8, according to one embodiment. Engine system 8 includes an internal combustion engine 10 having an engine housing 12 with a plurality of combustion cylinders 16 formed therein. A plurality of pistons 16 are positioned within cylinders 14 and movable in a generally conventional manner between a top-dead-center position and a bottom-dead-center position, typically although not necessarily in a four-stroke engine cycle. Cylinders 14 can include any number and any suitable arrangement, such as an in-line pattern, a V-pattern, or still another. Engine system 8 can be applied for purposes including vehicle propulsion, operation of a compressor, a pump, or an electrical generator to name a few examples.

Engine system 8 also includes an intake system 18 having an air inlet 20, and an intake conduit 22 extending to engine 10 to feed a stream of pressurized intake air to the plurality of cylinders 14. Intake conduit 22 includes a water port 24. In the illustrated embodiment water port 24 is located fluidly between a compressor 36 in a turbocharger 34 and an intake manifold 26 coupled to engine housing 12. Engine system 8 also includes an exhaust system 28 including an exhaust manifold 30, and an exhaust outlet 38. Exhaust conveyed from exhaust manifold 30 to exhaust outlet 38 passes through a turbine 32 in turbocharger 34.

Engine system 8 further includes a fuel system 40 having a methanol fuel supply 42, at least one pump 44, and a fuel supply conduit 45 extending from pump 44 to a plurality of methanol admission valves 46. Methanol admission valves 46 may be configured as port injectors positioned to inject a liquid methanol fuel just upstream of cylinders 14 into a stream of pressurized intake air conveyed to cylinders 14. Methanol admission valves 46 may each include an electrical actuator 47 that can be operated conventionally to control the timing and manner of fuel injection. Methanol fuel supply 42 may contain a liquid methanol fuel such as pure methanol, methanol blends where methanol predominates, or potentially still another alcohol-based fuel.

Fuel system 40 also includes a pilot fuel supply 48, a pilot fuel low-pressure pump 50, and a pilot fuel high-pressure pump 52. Fuel system 40 may also include a plurality of direct pilot fuel injectors 54 each positioned to extend partially into one of cylinders 14. Pilot fuel injectors 54 may also be electrically actuated according to conventional strategies. Methanol admission valves 46 and pilot fuel injectors 54 may each receive a feed of pressurized fuel, methanol and pilot fuel, respectively, from a common pressurized fuel reservoir or common rail. In other implementations, so-called unit injectors could be provided to pressurize fuel for one, or more than one but less than all, of the respective injectors. Still other fuel pressurization and delivery strategies could be used according to the present disclosure. The pilot fuel may be any suitable compression-ignition liquid fuel, such as a diesel distillate fuel, or a lower cetane fuel with a cetane enhancer. In a practical implementation a relatively small pilot injection of pilot fuel can be injected into each cylinder 14 and compression-ignited to ignite a relatively larger port-injected main charge of methanol fuel. Engine system 8 could also be configured to operate in a diesel-only mode, where no methanol is delivered and an entirety of a fueling requirement is satisfied by diesel fuel injection.

Engine system 8 may further include a water system 56 including a water tank 58, a water injector 60 coupled to water port 24, and a water conduit 62 extending from water tank 58 to water injector 60. Engine system 8 may also include a heater 64 structured to heat the water for injection sufficiently for injection as steam. Heating the water sufficiently for injection as steam includes heating the water at least to a boiling temperature, and typically above the boiling temperature of water at sea level (100° C.). Water may also be heated, or heated further, once in vapor form. In a practical implementation, steam will be injected through water injector 60. Water injector 60 or other components in water system 56 may be configured appropriately to store steam under pressure for injection or to permit water to more or less instantaneously flash to steam when water injector 60 is actuated open. Water injected into intake conduit 22 reduces or limits combustion temperatures to levels associated with reduction in production of NOx.

In the illustrated embodiment, heater 64 includes an exhaust-water heat exchanger coupled to water conduit 62, thus using engine exhaust and water as working fluids. A water pump 59 pumps water from water tank 58 through heater 64 to convey the same to water injector 60. Accordingly, a flow of hot engine exhaust from exhaust manifold 30 to exhaust outlet 38 exchanges heat with water pumped through water conduit 62. Appropriate pumping and temperature controls can be employed to control a temperature of the water via heating in heater 64 and a flow of the water and/or steam such that upon actuating water injector 60 steam is available for injection into intake conduit 22. Electrical heating of water for injection could be used as an alternative to heating the water via exhaust heat, or as a supplement, in some embodiments. As will be further apparent from the following description, engine system 8 is uniquely configured to controllably inject water to control combustion temperatures in engine 10 and thereby limit an exhaust NOx level of exhaust from engine 10. Injection of water for NOx control may also be implemented in conjunction with other known strategies, including adjustment of ignition timings, exhaust gas recirculation (EGR) and/or selective catalytic reduction (SCR), for instance.

To this end, engine system 8 further includes a NOx control system 70. NOx control system 70 may be understood to include water supply conduit 62, water injector 60, heater 64, and various sensors and electronic controls for limiting NOx. In one embodiment, NOx control system 70 includes a NOx sensor 72 positioned to directly sense NOx in exhaust from engine 10, for example, between turbine 34 and exhaust outlet 38 as illustrated. NOx control system 70 may also include one or more temperature sensors structured to indirectly indicate, estimate, or infer an exhaust NOx level of engine 10. For instance, NOx control system 70 may include at least one of an intake temperature sensor 74 or an exhaust temperature sensor 76 structured to monitor engine temperature parameters having a known or determinable relationship with exhaust NOx level. NOx control system 70 will typically include at least one sensor structured to monitor an engine parameter indicative of at least one of an exhaust NOx level of engine 10 or a change to an exhaust NOx level of engine 10. NOx control system 70 may include one or more of the sensors illustrated in FIG. 1 for use in monitoring one or more engine parameters indicative of an exhaust NOx level or a change to the exhaust NOx level of engine 10. Those skilled in the art will envision various alternative sensor arrangements, including virtual sensors, that can be used to determine or estimate an exhaust NOx level of an engine.

NOx control system 70 further includes a NOx control unit 80. NOx control unit 80 may include a programmable logic controller such as a microprocessor, a microcontroller, or another programmable logic unit, coupled to the at least one sensor monitoring the subject engine parameter, and in control communication with water injector 60. Water injector 60 may be electrically actuated, for example solenoid actuated. NOx control unit 80 is structured to receive data of the monitored engine parameter produced by sensor 72, 74, 76, and output a water injection command to water injector 60 based on the data, to limit the exhaust NOx level of engine 10 via injection of water into intake conduit 22.

NOx control system 70 may also include a location sensor 78. Those skilled in the art will be familiar with differing jurisdictional or regional requirements as to NOx emissions levels. Permissible or desired NOx emissions levels when a marine vessel is at port may differ from permissible or desired NOx emissions levels on the high seas, for example. Location sensor 78 can produce location data, such as global positioning (GPS) data, indicative of a location of a mobile machine utilizing engine system 8 such as a marine vessel. In other instances, differing permitted or desired NOx emissions levels could be encountered where engine system 8 is used in a land vehicle.

As further discussed herein, NOx control unit 80 may be further structured to determine a NOx error, and to iteratively reduce the NOx error via the water injection command. Determination of a NOx error can include comparing an exhaust NOx level indicated by the monitored engine parameter, including at least one of an exhaust NOx level or an exhaust temperature as discussed herein, to a target exhaust NOx level. Based upon a determined or estimated location of a machine using engine system 8, a target NOx level can be established by NOx control unit 80. In one implementation, NOx control unit 80 includes a computer readable memory storing different NOx target levels corresponding to different machine locations. In another implementation NOx control unit 80 could communicate with an external device or system that transmits permitted exhaust NOx levels, for example. In various implementations, NOx control unit 80 may receive data indicative of a change to a target exhaust NOx level, including location data or other data. Iteratively reducing an exhaust NOx error via injection of water into intake conduit 22 is one example as to limiting exhaust NOx level according to the present disclosure, and can be understood as a closed-loop limitation to NOx. For example, NOx control unit 80 might continuously or periodically sample exhaust NOx level and inject water as needed over the course of time to drive exhaust NOx levels toward a target exhaust NOx level or to maintain exhaust NOx level at or below the target exhaust NOx level by reducing a NOx error. In another example, operation could be open loop where NOx control unit 80 monitors an exhaust NOx level or determines an exhaust NOx error, and controllably commands water injection based upon a mapped relationship among water injection amount or duration, exhaust NOx level, and/or other engine parameters such as exhaust temperature and/or engine load.

INDUSTRIAL APPLICABILITY

Figure 2:
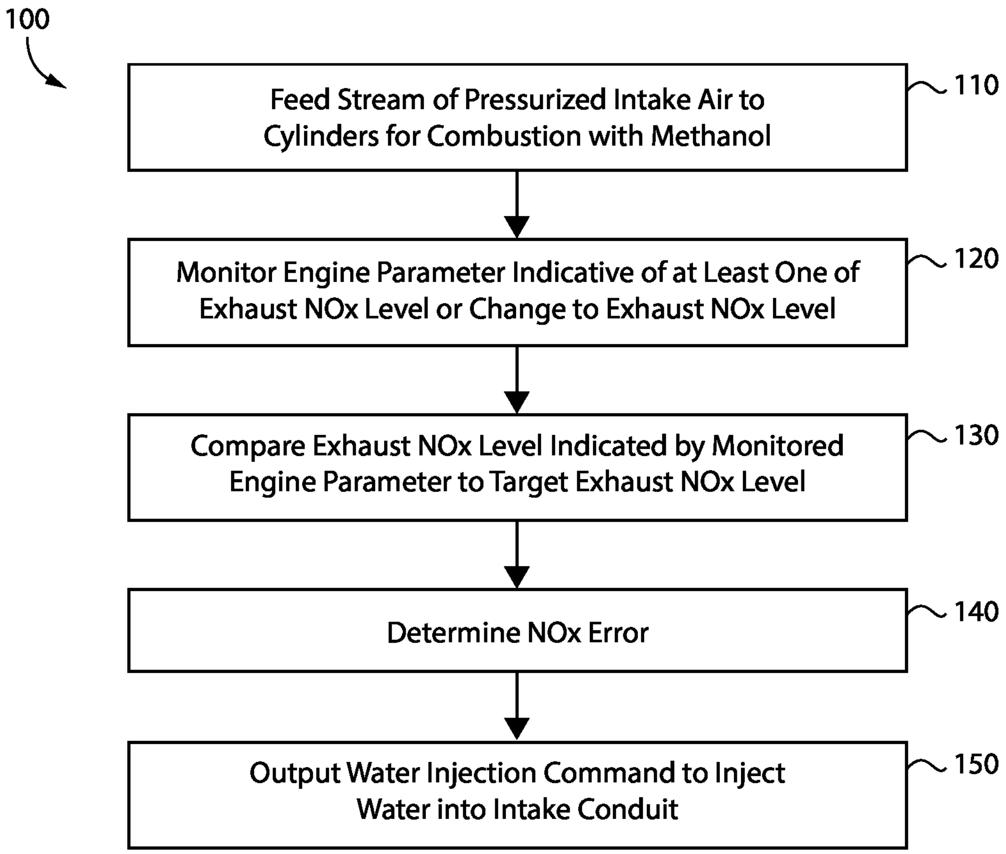
FIG. 2 is a flowchart illustrating example methodology and logic flow, according to one embodiment.

Referring also now to FIG. 2, there is shown a flowchart 100 illustrating example methodology and logic flow, according to one embodiment. At a block 110 a stream of pressurized intake air is fed through intake conduit 22 to cylinders 14 in engine 10 for combustion with methanol fuel. As discussed herein, combusting a methanol fuel and pressurized air in cylinders 14 could be initiated by way of compression-ignition of a directly injected liquid pilot fuel. In other instances, spark-ignition by way of sparkplugs each associated with one of cylinders 14 could be employed. Glow plugs could also be used in some implementations.

From block 110 flowchart 100 advances to a block 120 to monitor an engine parameter indicative of at least one of exhaust NOx level or change to exhaust NOx level. As discussed herein, the monitored engine parameter could include a directly monitored exhaust NOx level or an exhaust NOx level determined, estimated, or inferred indirectly. From block 120 flowchart 100 advances to a block 130 to compare the exhaust NOx level indicated by the monitored engine parameter to a target exhaust NOx level. It will be recalled the target exhaust NOx level could be based, for example, on a present location of engine system 8 and applicable jurisdictional or regional requirements.

From block 130 flowchart 100 advances to a block 140 to determine a NOx error. The NOx error could include an arithmetic difference between an indicated exhaust NOx level and a target NOx level, for example. Rather than an arithmetic difference, in some embodiments another quantitative term or even a qualitative term such as "high NOx" or "medium NOx" or "low NOx" might be used. From block 140 flowchart 100 advances to a block 150 to output a water injection command, such as an electrical current command to a solenoid actuator of water injector 60, to inject water typically as steam into intake conduit 22. The water injection command may be based on a difference between the exhaust NOx level indicated by the monitored engine parameter and the target exhaust NOx level, and in the illustrated case based on the determined NOx error.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an internal combustion engine system comprising:

feeding a stream of pressurized intake air from a compressor through an intake conduit to a plurality of cylinders in an engine;

admitting a methanol fuel to the plurality of cylinders by way of a plurality of methanol admission valves fluidly connected to a methanol fuel supply;

igniting the methanol fuel in each of the plurality of cylinders;

combusting the methanol fuel and the pressurized air in the plurality of cylinders;

monitoring an engine parameter indicative of at least one of an exhaust NOx level or a change to the exhaust NOx level of the engine;

injecting water, for reducing or limiting temperature in the plurality of cylinders, into the stream of pressurized intake air, based on the monitored engine parameter; and limiting the exhaust NOx level of the engine based on the injecting water; and heating the water prior to the injecting the water into the stream of pressurized intake air.

2. The method of claim 1 wherein the injecting water includes injecting the water as steam.

3. The method of claim 2 further comprising directly injecting a pilot fuel into each of the plurality of cylinders, and igniting the methanol fuel via compression-ignition of the pilot fuel.

4. The method of claim 2 wherein the injecting water further includes injecting water at an injection location of the intake conduit that is between the compressor and an intake manifold of the engine.

5. The method of claim 2 wherein the heating the water further includes heating the water prior to injection via exhaust heat of the engine.

6. The method of claim 1 wherein the monitoring an engine parameter includes monitoring at least one of an exhaust NOx level or an exhaust temperature.

7. The method of claim 6 further comprising comparing an exhaust NOx level indicated by the monitored engine parameter to a target exhaust NOx level.

8. The method of claim 7 further comprising determining an exhaust NOx error, and iteratively reducing the exhaust NOx error via the injecting water into the intake conduit.

9. The method of claim 7 further comprising receiving data indicative of a change to the target exhaust NOx level.

10. The method of claim 8 wherein the data indicative of a change to the target NOx level includes location data.

11. An internal combustion engine system comprising:

a methanol fuel supply;

an engine having a plurality of combustion cylinders formed therein, and a plurality of methanol admission valves fluidly connected to the methanol fuel supply;

an intake conduit including a water port, and extending to the engine to feed a stream of pressurized intake air to the plurality of cylinders;

a water injector coupled to the water port;

a sensor structured to monitor an engine parameter indicative of at least one of an exhaust NOx level of the engine or a change to an exhaust NOx level of the engine;

a NOx control unit coupled to the sensor and in control communication with the water injector, the NOx control unit being structured to:

receive data of the monitored engine parameter produced by the sensor; and output a water injection command to the water injector based on the data, to limit the exhaust NOx level of the engine via injection of water into the intake conduit.

12. The engine system of claim 11 further comprising a heater structured to heat the water sufficiently for injection as steam.

13. The engine system of claim 12 wherein the heater includes an exhaust-water heat exchanger.

14. The engine system of claim 11 wherein the sensor includes an exhaust NOx sensor.

15. The engine system of claim 14 wherein the NOx control unit is further structured to determine a NOx error, and to iteratively reduce the NOx error via the water injection command.

16. The engine system of claim 11 further comprising a location sensor, and the NOx control unit is further structured to establish a target exhaust NOx level based on location data produced by the location sensor.

17. The engine system of claim 11 further comprising a pilot fuel supply containing a compression-ignition pilot fuel, and a plurality of direct pilot fuel injectors coupled with the plurality of cylinders.

18. A NOx control system for an internal combustion engine comprising:

a water supply conduit;

a water injector fluidly connected to the water supply conduit;

a heater coupled to the water supply conduit and structured to heat water conveyed to the water injector sufficiently for injection as steam into an intake conduit for the engine;

a sensor structured to monitor an engine parameter indicative of at least one of an exhaust NOx level or a change to an exhaust NOx level of the engine; and a NOx control unit coupled to the sensor and in control communication with the water injector, the NOx control unit being structured to:

receive data of the monitored engine parameter produced by the sensor;

compare an exhaust NOx level indicated by the data to a target NOx level;

output a water injection command to the water injector based on a difference between the indicated exhaust NOx level and the target NOx level; and limit the exhaust NOx level of the engine based on an injection of water as steam produced in response to the water injection command.

19. The NOx control system of claim 18 further comprising a location sensor, and the NOx control unit is further structured to establish the target NOx level based on location data produced by the location sensor.

20. The NOx control system of claim 18 wherein the NOx control unit is further structured to determine a NOx error, and to iteratively reduce the NOx error via the water injection command.

* * * * *